US010883834B2

(12) United States Patent
Denaro

(10) Patent No.: US 10,883,834 B2
(45) Date of Patent: Jan. 5, 2021

(54) DATA MINING IN A DIGITAL MAP DATABASE TO IDENTIFY INSUFFICIENT SUPERELEVATION ALONG ROADS AND ENABLING PRECAUTIONARY ACTIONS IN A VEHICLE

(71) Applicant: HERE Global B.V., Eindhoven (NL)

(72) Inventor: Robert Denaro, Long Grove, IL (US)

(73) Assignee: HERE Global B.V., Eindhoven (NL)

( * ) Notice: Subject to any disclaimer, the term of this patent is extended or adjusted under 35 U.S.C. 154(b) by 157 days.

(21) Appl. No.: 15/878,555

(22) Filed: Jan. 24, 2018

(65) Prior Publication Data

US 2018/0156619 A1 Jun. 7, 2018

Related U.S. Application Data

(63) Continuation of application No. 14/808,015, filed on Jul. 24, 2015, now Pat. No. 9,909,881, which is a
(Continued)

(51) Int. Cl.
*G01C 21/26* (2006.01)
*G06F 16/29* (2019.01)
(Continued)

(52) U.S. Cl.
CPC ....... *G01C 21/26* (2013.01); *B60W 30/18009* (2013.01); *G06F 16/29* (2019.01);
(Continued)

(58) Field of Classification Search
None
See application file for complete search history.

(56) References Cited

U.S. PATENT DOCUMENTS

| 5,270,708 A | 12/1993 | Kamishima |
| 5,315,295 A | 5/1994 | Fujii |

(Continued)

FOREIGN PATENT DOCUMENTS

| EP | 1069547 | 1/2001 |
| EP | 1104881 A1 | 6/2001 |

OTHER PUBLICATIONS

European Search Report for related European Application No. 09251231.8 dated Apr. 5, 2016.
(Continued)

*Primary Examiner* — Thomas G Black
*Assistant Examiner* — Ana D Thomas
(74) *Attorney, Agent, or Firm* — Lempia Summerfield Katz LLC

(57) ABSTRACT

Disclosed is a feature for a vehicle that enables taking precautionary actions in response to conditions on the road network around or ahead of the vehicle, in particular, a curved portion of a road with insufficient superelevation. A database that represents the road network is used to determine locations where curved sections of roads have insufficient superelevation (banking), i.e., where the superelevation is below a threshold. Then, precautionary action data is added to the database to indicate a location at which a precautionary action is to be taken about the location of insufficient superelevation. A precautionary action system installed in a vehicle uses this database, or a database derived therefrom, in combination with a positioning system to determine when the vehicle is at a location that corresponds to the location of a precautionary action. When the vehicle is at such a location, a precautionary action is taken by a vehicle system as the vehicle is approaching a location of insufficient superelevation.

37 Claims, 5 Drawing Sheets

Related U.S. Application Data continuation of application No. 12/156,326, filed on May 30, 2008, now Pat. No. 9,121,716.

(51) Int. Cl.
*B60W 30/18* (2012.01)
*B60W 10/06* (2006.01)
*B60W 10/184* (2012.01)

(52) U.S. Cl.
CPC ........... *B60W 10/06* (2013.01); *B60W 10/184* (2013.01); *B60W 2552/00* (2020.02); *B60W 2556/50* (2020.02)

(56) References Cited

U.S. PATENT DOCUMENTS

| | | | |
|---|---|---|---|
| 5,904,728 A | 5/1999 | Tamai | |
| 5,983,389 A * | 11/1999 | Shimizu | H03M 13/151 |
| | | | 714/781 |
| 6,092,014 A * | 7/2000 | Okada | G01P 15/00 |
| | | | 340/438 |
| 6,141,619 A | 10/2000 | Sekine | |
| 6,223,125 B1 | 4/2001 | Hall | |
| 6,226,389 B1 | 5/2001 | Lemelson | |
| 6,343,253 B1 | 1/2002 | Matsuura et al. | |
| 6,405,128 B1 | 6/2002 | Bechtolsheim et al. | |
| 6,411,896 B1 * | 6/2002 | Shuman | G01C 21/32 |
| | | | 340/425.5 |
| 6,466,867 B1 | 10/2002 | Sakashita | |
| 6,470,265 B1 | 10/2002 | Tanaka | |
| 6,674,434 B1 | 1/2004 | Chojnacki | |
| 6,696,976 B1 | 2/2004 | Hansen | |
| 6,853,919 B2 | 2/2005 | Kellum | |
| 6,895,332 B2 | 5/2005 | King | |
| 7,043,357 B1 | 5/2006 | Stankoulov et al. | |
| 7,171,306 B2 | 1/2007 | Hirose | |
| 7,184,073 B2 | 2/2007 | Varadarajan et al. | |
| 7,194,347 B2 | 3/2007 | Harumoto | |
| 7,751,973 B2 | 7/2010 | Ibrahim | |
| 8,204,680 B1 | 6/2012 | Dorum | |
| 8,571,811 B1 | 10/2013 | Mueller | |
| 8,775,073 B2 | 7/2014 | Denaro | |
| 9,121,716 B2 | 9/2015 | Denaro | |
| 9,182,241 B2 | 11/2015 | Denaro | |
| 9,752,884 B2 | 9/2017 | Denaro | |
| 2001/0020902 A1 | 9/2001 | Tamura | |
| 2002/0188400 A1 | 12/2002 | Sato et al. | |
| 2002/0194016 A1 | 12/2002 | Moribe et al. | |
| 2003/0005765 A1 | 1/2003 | Brudis et al. | |
| 2003/0043059 A1 | 3/2003 | Miller, Jr. | |
| 2003/0090392 A1 | 5/2003 | Schuessler | |
| 2004/0030670 A1 | 2/2004 | Barton | |
| 2004/0107047 A1 | 6/2004 | Joshi | |
| 2004/0143390 A1 | 7/2004 | King et al. | |
| 2004/0143391 A1 * | 7/2004 | King | G01C 21/26 |
| | | | 701/468 |
| 2004/0193347 A1 | 9/2004 | Harumoto et al. | |
| 2004/0201495 A1 * | 10/2004 | Lim | G08G 1/096758 |
| | | | 340/905 |
| 2004/0201672 A1 | 10/2004 | Varadarajan et al. | |
| 2005/0149251 A1 | 7/2005 | Donath et al. | |
| 2005/0192746 A1 * | 9/2005 | King | G08G 1/0965 |
| | | | 701/468 |
| 2005/0240334 A1 | 10/2005 | Matsumoto et al. | |
| 2005/0251335 A1 | 11/2005 | Ibrahim | |
| 2005/0264404 A1 | 12/2005 | Franczyk et al. | |
| 2006/0041372 A1 | 2/2006 | Kubota et al. | |
| 2006/0109095 A1 | 5/2006 | Takata et al. | |
| 2006/0287817 A1 | 12/2006 | Nagel | |
| 2007/0021910 A1 | 1/2007 | Iwami et al. | |
| 2007/0027583 A1 | 2/2007 | Tamir et al. | |
| 2007/0040705 A1 | 2/2007 | Yoshioka et al. | |
| 2007/0050127 A1 | 3/2007 | Kellum et al. | |
| 2007/0162019 A1 | 7/2007 | Burns et al. | |
| 2007/0192020 A1 | 8/2007 | Brulle-Drews et al. | |
| 2007/0222662 A1 | 9/2007 | Toennesen et al. | |
| 2007/0288158 A1 | 12/2007 | Dorum | |
| 2008/0004806 A1 | 1/2008 | Kimura et al. | |
| 2008/0033621 A1 | 2/2008 | Nakamura et al. | |
| 2008/0042815 A1 | 2/2008 | Breed et al. | |
| 2008/0046274 A1 | 2/2008 | Geelen et al. | |
| 2008/0169914 A1 | 7/2008 | Albertson | |
| 2008/0215238 A1 | 9/2008 | Geelen et al. | |
| 2008/0243380 A1 | 10/2008 | Han | |
| 2009/0144030 A1 | 6/2009 | Witmer | |
| 2009/0295598 A1 | 12/2009 | Denaro | |
| 2009/0295604 A1 | 12/2009 | Denaro | |
| 2009/0299615 A1 | 12/2009 | Denaro | |
| 2009/0299616 A1 | 12/2009 | Denaro | |
| 2009/0299617 A1 | 12/2009 | Denaro | |
| 2009/0299622 A1 | 12/2009 | Denaro | |
| 2009/0299624 A1 | 12/2009 | Denaro | |
| 2009/0299625 A1 | 12/2009 | Denaro | |
| 2009/0299626 A1 | 12/2009 | Denaro | |
| 2009/0299630 A1 | 12/2009 | Denaro | |
| 2009/0300035 A1 | 12/2009 | Denaro | |
| 2009/0300053 A1 | 12/2009 | Denaro | |
| 2009/0300067 A1 | 12/2009 | Denaro | |
| 2010/0001133 A1 | 1/2010 | Kempa et al. | |
| 2010/0121886 A1 | 5/2010 | Koshiba et al. | |
| 2016/0018227 A1 | 1/2016 | Denaro | |

OTHER PUBLICATIONS

European Office Action dated Mar. 8, 2018, European Office Action cited in the corresponding European Application No. 09 251 231.8; dated Mar. 8, 2018; 6 pages.

European Office Action for European Patent Application No. 09 251 231.8-1001 dated Oct. 23, 2020.

* cited by examiner

DATA MINING IN A DIGITAL MAP DATABASE TO IDENTIFY INSUFFICIENT SUPERELEVATION ALONG ROADS AND ENABLING PRECAUTIONARY ACTIONS IN A VEHICLE

REFERENCE TO RELATED APPLICATIONS

This application is a continuation under 37 C.F.R. § 1.53(b) of U.S. patent application Ser. No. 14/808,015 filed Jul. 24, 2015 U.S. Pat. No. 9,909,881, which is a continuation under 37 C.F.R. § 1.53(b) of U.S. patent application Ser. No. 12/156,326 filed May 30, 2008 U.S. Pat. No. 9,121,716 the entire disclosure of which is hereby incorporated by reference. The present patent application is related to patent application Ser. No. 12/156,264, filed on May 30, 2008, now U.S. Pat. No. 9,134,133, entitled "DATA MINING TO IDENTIFY LOCATIONS OF POTENTIALLY HAZARDOUS CONDITIONS FOR VEHICLE OPERATION AND USE THEREOF,", the entire disclosure of which is incorporated by reference herein.

BACKGROUND

The present invention relates to a method and system that enables taking a precautionary action in a vehicle, such as providing a warning to a vehicle driver about a potentially difficult or hazardous driving condition on the road network.

Advanced driver assistance systems ("ADAS"), including active safety and fuel economy systems, have been developed to improve the comfort, efficiency, safety, and overall satisfaction of driving. Examples of these advanced driver assistance systems include adaptive headlight aiming, adaptive cruise control, lane departure warning and control, curve warning, speed limit notification, hazard warning, predictive cruise control, and adaptive shift control, as well as others. Some of these advanced driver assistance systems use a variety of sensor mechanisms in the vehicle to determine the current state of the vehicle and the current state of the roadway in front of the vehicle. These sensor mechanisms may include radar, infrared, ultrasonic and vision-oriented sensors, such as digital video cameras and lidar. Some advanced driver assistance systems also use digital map data. Digital map data can be used in advanced driver assistance systems to provide information about the road network, road geometry, road conditions and other items associated with the road and terrain around the vehicle. Digital map data is not affected by environmental conditions, such as fog, rain or snow. In addition, digital map data can provide useful information that cannot reliably be provided by cameras or radar, such as curvature, grade, bank, speed limits that are not indicated by signage, traffic and lane restrictions, etc. Further, digital map data can provide a predictive capability well beyond the range of other sensors or even beyond the driver's vision to determine the road ahead of the vehicle, around corners, over hills or beyond obstructions. Accordingly, digital map data can be a useful addition for some advanced driver assistance systems.

Although these kinds of systems provide useful features, there exists room for further improvements. For example, it would be useful to identify locations on the road network where a relatively high number of traffic accidents have occurred. However, statistics pertaining to accidents are maintained by various different administrative entities that use different formats, standards, reporting methods, reporting periods, etc. Accordingly, it is difficult to obtain consistent information about traffic accidents on roads in a large geographic region, such as the entire United States or Europe. Moreover, data indicating locations where a statistically large number of traffic accidents occur may not indicate the causes of the accidents or how accidents can be avoided.

Accordingly, it is an objective to provide a system that facilitates taking a precautionary action in a vehicle, such as providing a warning to a vehicle operator, when approaching a location where accidents may occur.

SUMMARY

To address these and other objectives, the present invention comprises a feature that enables taking a precautionary action in a vehicle as the vehicle approaches the location of a curve that is banked outward instead of inward toward the center of the curve radius. The precautionary action may be a warning message provided to the vehicle driver to alert the vehicle driver about the curve that is banked outward so that the vehicle driver can pay extra attention. Alternatively, the precautionary action may be an actual modification of the operation or control of the vehicle, such as braking, accelerating, or maneuvering the vehicle, or activating a sensor. Alternatively, the precautionary action may be providing an input to an algorithm that also processes inputs from other sensors for taking such actions. In another alternative, the precautionary action may include a combination of any of these aforementioned actions.

According to another aspect, a database that represents the road network is used to determine locations where curves are banked outward instead of inward. Then, precautionary action data is added to the database to indicate a location at which a precautionary action is to be provided about the curve with that is banked outward.

According to further aspects, a precautionary action system installed in a vehicle uses this database, or a database derived therefrom, in combination with a positioning system, to determine when the vehicle is at a location that corresponds to the location where a precautionary action should be taken. When the vehicle is at such a location, the precautionary action is taken, such as providing a warning to the vehicle operator, as the vehicle is approaching a curve that is banked outward. Alternatively, the precautionary action may consist of an actual modification of the operation or control of the vehicle, such as braking, accelerating, or maneuvering the vehicle, or activating a sensor. Alternatively, the precautionary action may include providing an input to an algorithm that also processes inputs from other sensors for taking such actions. Alternatively, the precautionary action may be an adjustment of sensitivities of other ADAS applications such as increasing the control authority and sensitivity of a lane departure warning or control system to lane edge approach and violation. In another alternative, the precautionary action may include a combination of any of these aforementioned actions.

DETAILED DESCRIPTION OF THE DRAWINGS AND PRESENTLY PREFERRED EMBODIMENTS

Figure 1:
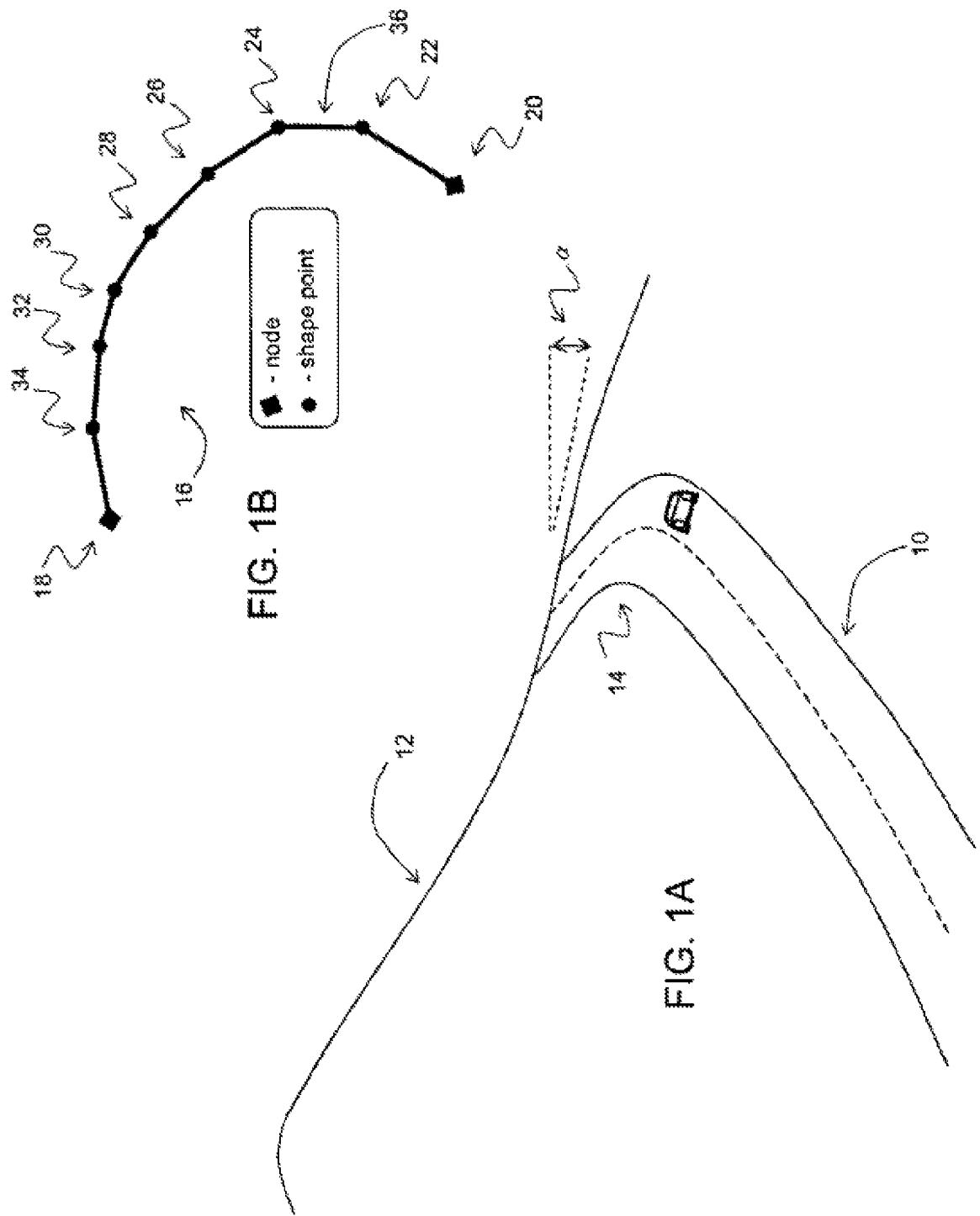
FIGS. 1A and 1B illustrate a portion of a road network with a curve in which the superelevation (banking) is sloping outward.

FIG. 1A depicts a road segment 10. The road segment 10 is located along a hill 12. The road segment 10 is curved along a portion 14 thereof.

Superelevation refers to a property of the road. Specifically, the superelevation of a road refers to the transverse inclination of the road surface in a curved portion of the road. Superelevation is also referred to as banking. A positive superelevation refers to a transverse inclination in which the outside edge of the road (i.e., the side farthest from the center of the curve radius) is at a higher elevation than the inside edge. A negative superelevation refers to a transverse inclination in which the outside edge of the road is at a lower elevation that the inside edge. A neutral superelevation refers to a road surface in a curve in which the outside and inside edges are at the same elevation. Roads are often constructed with a positive superelevation in curves to counter centrifugal forces that might cause slippage. A road with neutral or negative superelevation in a curve typically cannot be driven as fast as a road with positive superelevation.

Referring to FIG. 1A, the road 10 is shown to have a negative superelevation in the curved portion 14. The transverse inclination of the road 10 in the portion 14 is shown to slope away from the curve by an angle .alpha.

Figure 2:
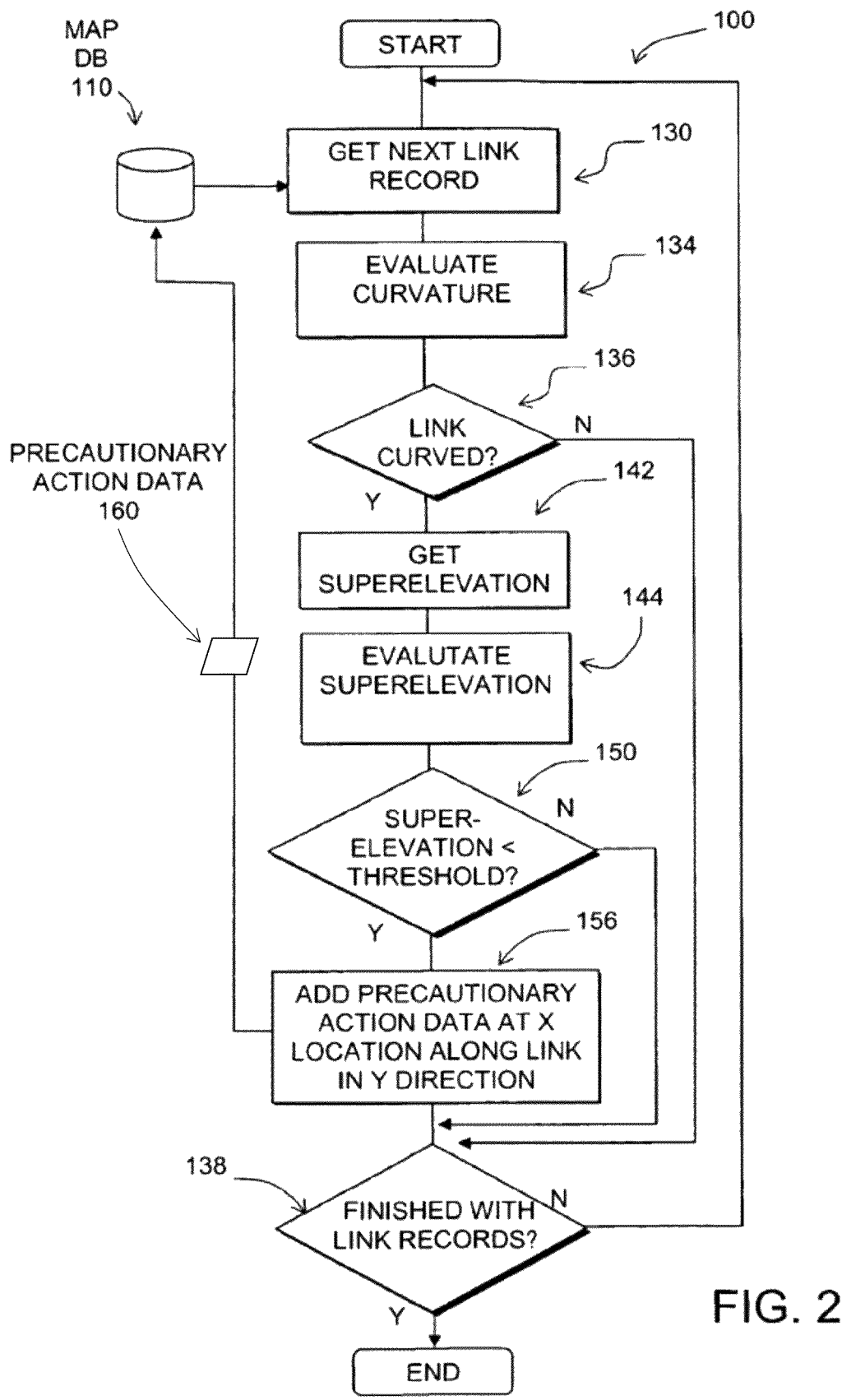
FIG. 2 is a flowchart of a process that uses a database that represents a road network to identify conditions such as the one shown in FIG. 1.

FIG. 1B is an illustration of how the road 10 in FIG. 1A is represented by data contained in a map database (such as the database 110 in FIG. 2). The road segment 10 is represented by a data record that defines a line 16 that extends between two endpoints, or nodes, 18 and 20. The location of the road segment 10 is defined by the data indicating the locations (e.g., geographic coordinates, including altitude) of the nodes. The data record that represents the road segment 10 includes data that indicates the shape of the road segment 10. One way to represent the shape of the road segment is to define shape points along the road segment. Shape points indicate the geographic coordinates at points along the road segment between the nodes. In the case of a straight road segment, no shape points are required. However, in the case of a curved road segment, one or more shape points are used to define locations along the road segment. FIG. 1B shows several shape points, 22, 24, 26 . . . 34, defined along the road segment between the endpoints, i.e., nodes 18 and 20. Thus, the curved road segment 10 in FIG. 1A is represented by an approximation comprised of a series of short, straight lines 36, as shown in FIG. 1B. (Alternatively, a database may represent a curved road segment by a curved line, such as a spline, clothoid, etc. In this alternative, data that defines the curved line is included in the database.)

The database representation of the curved road segment also includes data that indicates the superelevation along the road segment. One way to do this is to associate superelevation values with shape points defined for the curved road segment. In the case of a curved road represented by curved line, other methods may be used, such as indicating the superelevation at a point along the line.

FIG. 2 is a flowchart of a process 100. The process 100 is performed by a software program or routine that is run on a suitable computing platform, such as a database server, PC or plurality of PCs coupled together for parallel computing applications.

The process 100 uses a database 110 that contains data that represents the road network in a region. The region may be a country, such as the United States, Germany, France or Korea. Alternatively, the region may include several countries or an entire continent. According to another alternative, the region may include only a portion of a country, such as a state or several states or metropolitan areas.

The process 100 is performed by a map developer, such as NAVTEQ Corporation. Alternatively, the process 100 may be performed by another entity that has access to an editable version of a map database 110. For example, the process may be performed by a customer or licensee of NAVTEQ, such as a manufacturer of navigation systems or active safety systems, or by a traffic information services company or by a government office at any level.

The database 110 is in a format that can be edited. That is, new or updated information can be added to the database 110. Alternatively, the database 110 is in a format such that new information can be combined with the original data to form a new database that includes both the original data and new data. In one embodiment, the database is in an Oracle spatial format. Alternatively, the database may be in delivery format, such as GDF (Geographic Data File), SIF (Standard Interchange Format), or other formats, including proprietary formats.

As stated above, the database 110 contains data that represents the road network in the region. The database 110 contains information such as the locations (geographic coordinates, including altitude) of roads and intersections, road names, the three-dimensional shape of the roads including curvature, slope and bank, speed limits along roads, turn restrictions at intersections, addresses or address ranges along roads, the number of lanes each road has, lane width, lane markings, functional classes of roads, the locations of medians, and so on. The database may also contain information about other geographic features, such as bodies of water, parks, administrative areas (including municipal, state and country boundaries), and locations of points of interest, such as businesses, hospitals, police stations, and so on.

In FIG. 2, the process 100 examines each data record that represents a road segment (also referred to herein as a "link") to determine whether it represents one similar to the road segment 10 in FIG. 1A. (The process 100 may use a procedure that examines in turn each data record that represents each road segment represented in the entire database.) In one step, a data record that represents a link or road segment is read from the database 110 (Step 130). This road segment record may include data (e.g., shape points) that indicate whether the road segment is curved. This data is evaluated (Step 134). If the represented road segment is not curved, the process 100 proceeds to a step in which it is determined whether all the road segment records in the database have been examined (Step 138). If there are more segment records to examine, the process 100 proceeds to get the next segment record (Step 130) and continues.

Referring back to Step 136, if the represented road segment is curved, the process 100 proceeds to obtain the data that indicates the superelevation along the road segment's curved portion (Step 142). This superelevation data is evaluated (Step 144). From an evaluation of the degree of curvature, as well as the superelevation information associated with the segment's curved portion, it is determined whether there exists insufficient superelevation (such as the negative superelevation in the curved portion 14 shown in FIG. 1A). If examination of the segment's curvature and superelevation information indicates that there is sufficiently positive superelevation in a curved portion of the road, the process 100 proceeds to the step in which it is determined whether all the road segment records in the database have been examined (Step 138) and if there are more segment records to examine, the process 100 proceeds to get the next segment record (Step 130).

Referring back to Step 150, if examination of the segment's curvature and superelevation information indicates that there is insufficient superelevation (i.e., negative, neutral or not sufficiently positive for the degree of curvature) along a curved portion of the road segment, the process 100 adds precautionary action data 160 to the database 110 (Step 156). The precautionary action data 160 indicates the presence of a feature in the road network where a precautionary action may be taken.

In determining whether to add precautionary action data to the database 110, a threshold may be used. For example, a threshold value of zero may be used. With a threshold value of zero, precautionary action data would be added for any curved section that has a negative superelevation. Alternatively, a threshold value may be set at other values, such as −2.degree. or +2.degree.

After the precautionary action data 160 is added to the database 110, the process 100 proceeds to the step in which it is determined whether all the road segment records in the database have been examined (Step 138) and if there are more segment records to examine, the process 100 proceeds to get the next segment record (Step 130).

The process 100 ends when it is determined whether all the road segment records have been examined (Step 138).

It is noted that the process 100, above, performs a data mining function. The existence of the potentially difficult location, i.e., a curve with insufficient positive superelevation, is derived from data already collected and present in the database. It is noted that the process 100, above, evaluates multiple data items in the original database, to determine whether the condition exists, in this case, insufficient positive superelevation. By evaluating these multiple data items, a determination is made whether these multiple data items describe the condition of interest. If these data items do describe the condition, a new data item, i.e., the precautionary action data, is added to the database.

The above process for determining whether a sufficiently positive superelevation exists can take into account other factors, such as speed limits, road surface, the presence and type of shoulders, and so on. According to this alternative, the threshold may take into account the speed limit along the road segment (which is also stored as data in the database 110.) For example, a road segment with a 55 mph speed limit would have a threshold of +10.degree. defined as sufficiently positive. In the case, precautionary action data would be added if the superelevation were only +8.degree. On the other hand, a road segment with a 20 mph speed limit might have a threshold of +1.degree. defined as sufficiently positive so that superelevation of +8.degree. would not require including precautionary action data.

Figure 3:
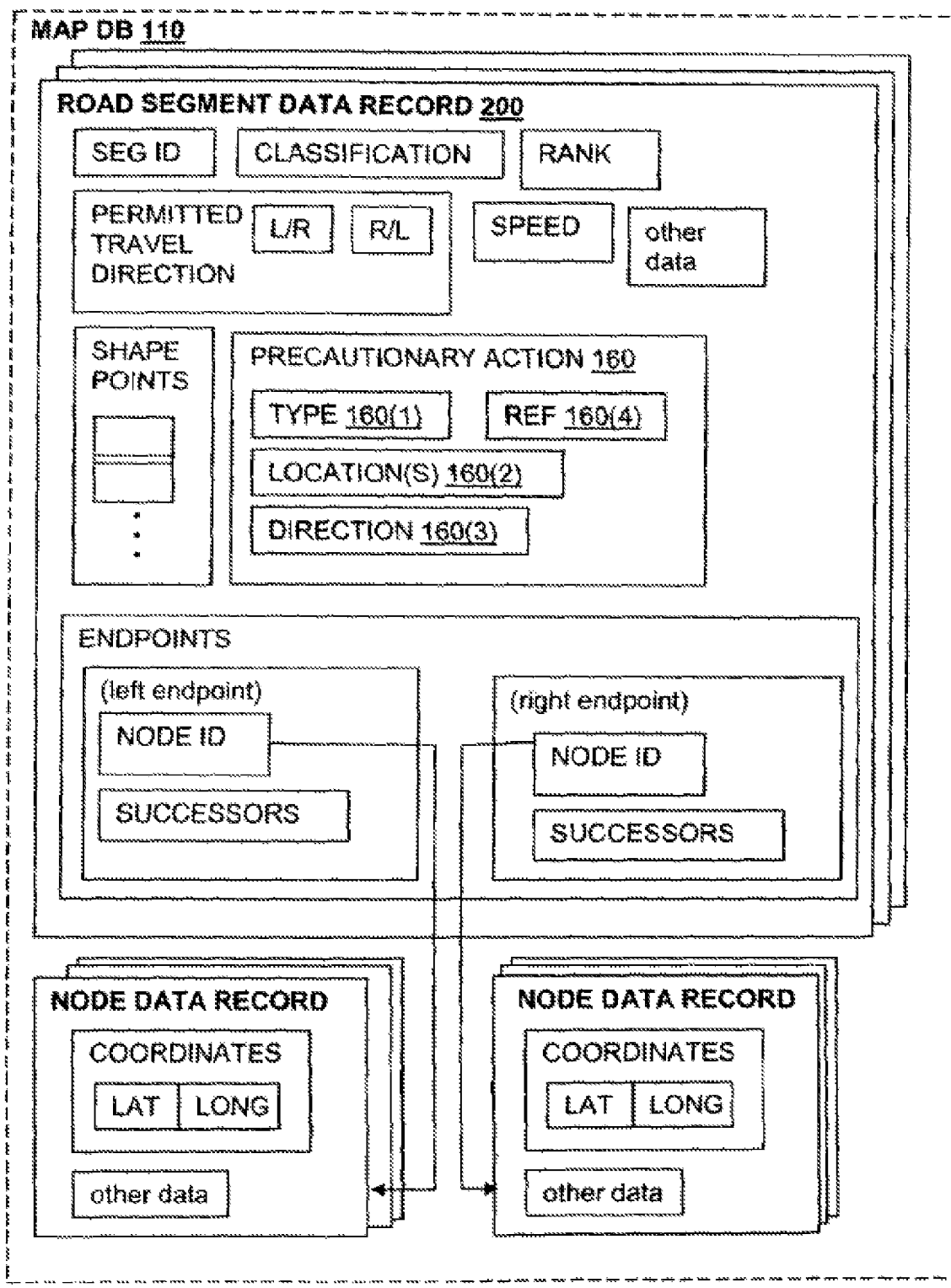
FIG. 3 is a diagram of a data record formed by the process of FIG. 2.

FIG. 3 is a diagram that shows a data record 200 in the database 110. The data record 200 represents a road segment located in a geographic region. As explained above, the geographic region may include an entire country or continent. Accordingly, the database 110 includes many data records like the one shown in FIG. 3.

The data record 200 shown in FIG. 3 is exemplary and shows only one way to represent a road segment. Databases may represent road segments in various different ways and may include different kinds of information. The present invention is not limited to any particular way of representing roads.

Referring to FIG. 3, various data are associated with the data record 200 that represents a road segment. This various data indicates features or attributes of the represented road segment. For example, associated with the data record is data that indicates the permitted direction(s) of travel. Also associated with the road segment record 200 are data that indicate a speed limit, a classification of the road segment (i.e., the type of road, such as controlled access, etc.), a rank (e.g., 1-4), the endpoints of the road segment, shape points (i.e., locations along the road segment between its endpoints). Also associated with the road segment records is data that indicate the successors at each endpoint. Successors are those road segments that connect to the represented road segment at each of its endpoints. The segment record 200 may identify these successors by reference to the data records that represent the successors.

In FIG. 3, the database 110 also includes precautionary action data 160. The precautionary action data 160 is the data added to the database 110 by the process 100 in FIG. 2. In FIG. 3, the precautionary action data 160 is shown as added to the road segment record 200. It should be understood that the process 100 adds precautionary action data 160 with respect to only certain records, i.e., records that represent those roads segments that meet the conditions identified by the process. Accordingly, the database 110 will contain data records that represent road segments that contain the precautionary action data 160 and other data records that represent road segments that do not contain the precautionary action data 160.

In the embodiment shown in FIG. 3, the precautionary action data 160 is associated with the road segment identified as having insufficient superelevation along a curve. In this embodiment, the precautionary action data 160 includes several components. One component 160(1) indicates a condition type. This condition type 160(1) indicates the type of condition about which a precautionary action is to be taken, which in this case is an insufficient superelevation along a curve. This condition type 160(1) component is used when different conditions are identified in the database 110 about which precautionary action may be taken.

Another component of the precautionary action data 160 is the precautionary action location 160(2). The precautionary action location 160(2) indicates where along the represented road segment a precautionary action may be taken. The precautionary action location 160(2) data may include multiple entries. For example, the precautionary action location 160(2) may indicate where a warning may be provided to a vehicle driver to advise the driver about the upcoming condition, i.e., the insufficient superelevation along a curve. In the case of insufficient superelevation along a curve, the warning location 160(2) may indicate a distance (e.g., x meters) from the curve. The location 160(2) is determined based on an analysis of factors, such as the superelevation, curvature, the speed limit along the represented road segment, the road classification, and possibly other factors. These factors may be determined from other data contained in the database 110. According to one example, the location 160(2) may indicate that a warning should be provided at a location 400 meters along the road segment from the curve.

The precautionary action location 160(2) may also indicate where a vehicle control action should be taken, such as tightening the seatbelts, pre-loading or engaging the brakes, tightening sensitivities of lane departure warning systems or stability control systems, etc. This may be a different location from where the precautionary warning is provided and would be based on a different analysis of factors.

Another component of the precautionary action data 160 is direction data 160(3). The direction data 160(3) indicates the direction along the represented road segment where the precautionary action should be taken. In this case, the direction data 160(3) may indicate both directions. (Note that the database 110 may indicate a direction along a road segment as positive or negative based on the relative latitude and longitude of the road segment endpoints.)

Another component of the precautionary action data 160 is a reference 160(4). In this case, the reference 160(4) indicates the location of the insufficient superelevation along a curve. The reference 160(4) may refer to shape points that represent the curved portion of the road.

The precautionary action data 160 described in FIG. 3 is one way that this data may be included in a database that represents a geographic region. There are alternative ways to include the precautionary action data. For example, the precautionary action data may be included as separate data records in the database 110. If included as separate data records, the precautionary action data may be associated with the road segments to which they apply by pointers or other suitable data references. Alternatively, the precautionary action data may be associated with node data records, instead of the road segments leading to the intersections. Various other ways exist and the present invention is not intended to be restricted to any specific implementation.

Figure 4:
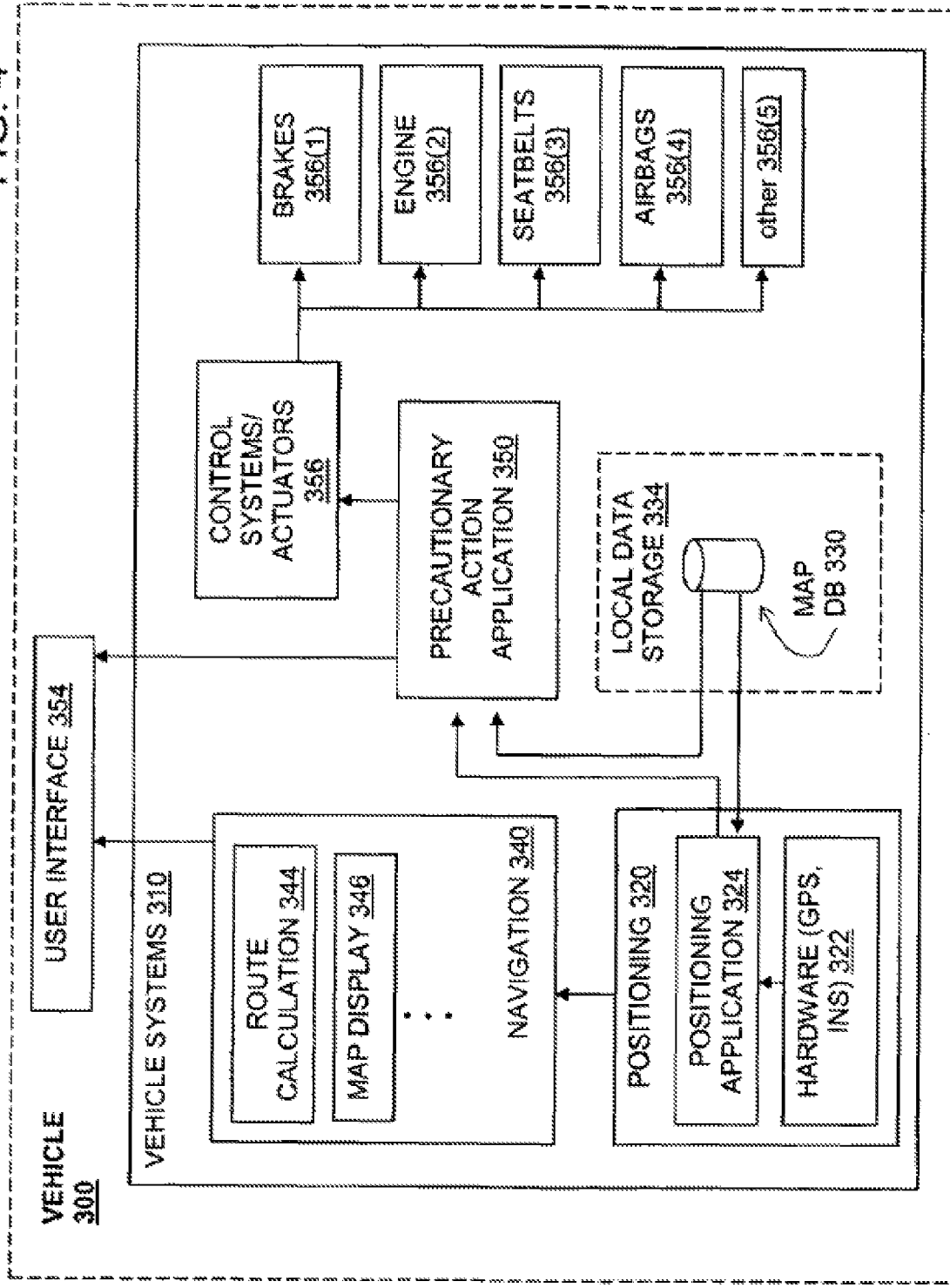
FIG. 4 is a diagram of a vehicle system that uses data produced by the process of FIG. 2.

FIG. 4 is a diagram depicting components of a vehicle 300. The vehicle 300 is operated on a road network, such as the road network represented by the database 110 in FIG. 2. The vehicle 300 may be an automobile, truck, bicycle, motorcycle, etc.

The vehicle 300 includes systems 310. In this embodiment, the vehicle systems 310 include a positioning system 320. The positioning system 320 determines the position of the vehicle 300 on the road network. The positioning system 320 includes appropriate hardware and software to determine the position of the vehicle 300. For example, the positioning system may include hardware 322 that includes a GPS unit, an accelerometer, wheel speed sensors, etc. The positioning system 320 also includes a positioning application 324. The positioning application 324 is a software application that uses outputs from the positioning system hardware 322 and information from a map database 330. The positioning application 324 determines the position of the vehicle 300 with respect to the road network, including the location of the vehicle 300 along a road segment and a direction of travel of the vehicle along the road segment.

In one embodiment, the map database 330 is located in the vehicle. In an alternative embodiment, the map database 330 may be located remotely and accessed by the vehicle systems 310 using a wireless communication system. In yet another embodiment, part of the map database 330 may be located locally in the vehicle and part of the map database 330 may be located remotely.

The map database 330 is stored on a computer readable medium 334. The computer-readable medium may be implemented using any suitable technology. For example, the computer readable medium may be a DVD disk, a CD-ROM disk, a hard disk, flash memory, or any other medium, or a plurality of media.

The map database 330 includes data that represents the geographic region in which the vehicle 300 is being operated. The map database 330 may represent the same geographic region as the database 110 in FIG. 2, or alternatively, the map database 330 may represent only a portion of the region represented by the database 110.

The map database 330 used by the vehicle systems 310 may be in a different format from the database 110 in FIG. 2. The map database 330 is formed or derived from the database 110 by a compilation process that organizes and presents the data in a form and format that specifically facilitates its use for performing specific functions. For example, the map database 330 may be separated into different collections of data that are used for specific functions, such as vehicle positioning, route calculation, map display, route guidance, destination selection, and so on. The map database 330 may also be organized into groupings spatially. One kind of compiled database format is disclosed in U.S. Pat. No. 5,968,109, the entire disclosure of which is incorporated by reference herein. Various other compiled database formats exist, including proprietary formats, and the disclosed embodiment(s) are not limited to any particular format.

Included among the vehicle systems 310 in FIG. 4 is a navigation system 340. The navigation system 340 uses outputs from the positioning system 320 and data from the map database 330 to provide navigation-related features to a vehicle user, e.g., the vehicle operator or passenger. The navigation system 340 includes applications for route calculation 344, map display 346, as well as possibly other applications. The navigation system 340 provides the navigation-related features to the vehicle user via a user interface 354. (The navigation system 340 is optional and may be omitted.)

Also included among the vehicle systems 310 is a precautionary action application 350. The precautionary action application 350 uses outputs from the positioning system 320 and data from the map database 330 to take precautionary actions, such as provide warnings to the vehicle operator. The precautionary action application 350 provides the warning to the vehicle operator via the user interface 354.

FIG. 4 also shows that precautionary action application 350 provides an output to vehicle control systems and actuator 356. The vehicle control systems and actuator are operatively connected to various vehicle mechanical systems, such as the vehicle's brakes 356(1), engine 356(2), seatbelts (including tensioners) 356(3), airbags 356(4), stability control algorithms, as well as other system systems 356(5).

Figure 5:
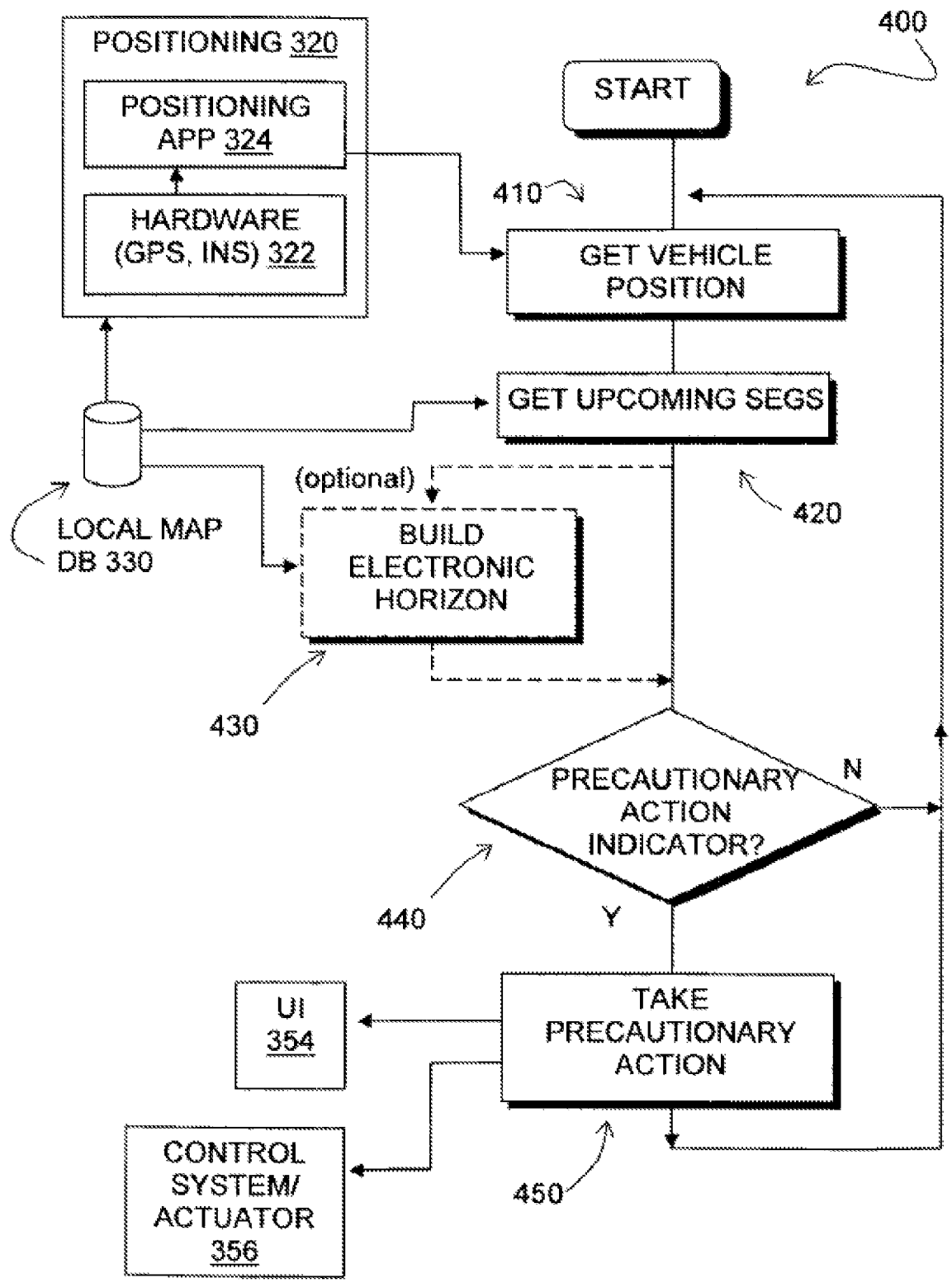
FIG. 5 is a flowchart of a process performed by the system of FIG. 4.

FIG. 5 is a flowchart 400 showing operation of the precautionary action application 350 (in FIG. 4). As the vehicle 300 (in FIG. 4) is being operated on a road, the precautionary action application 350 obtains the current vehicle position from the positioning system 320 (Step 410). (During vehicle operation, the positioning system 320 continuously determines the current geographic position of the vehicle 300 as the vehicle is being operated using data from the map database 330.) The positioning system 320 provides the precautionary action application with data that indicates the current vehicle position with respect to the road network as represented by the map database 330. Specifically, the location of the vehicle along a road segment and the direction of travel of the vehicle along the road segment are determined and provided to the precautionary action application 350.

Next, the process 400 obtains data from the map database 300 that represents the geographic features (i.e., roads, intersections, etc.) at the current location of the vehicle and in the direction in which the vehicle is heading (Step 420). In one embodiment, an electronic horizon is used (Step 430).

Building an electronic horizon and using it to provide warnings are disclosed in U.S. Pat. Nos. 6,405,128 and 6,735,515 and U.S. patent application Ser. No. 11/400,151, the entire disclosures of which are incorporated by reference herein. Using an electronic horizon and/or the inventions disclosed in these patents and pending patent application is optional and the disclosed process 400 is not limited to using the electronic horizon technology.

After obtaining data from the map database 300 that represents the geographic features at the current location of the vehicle and in the direction in which the vehicle is heading, the process 400 includes the step of examining the data to determine whether any precautionary action data (160 in FIG. 3) is associated with the represented geographic features (Step 440). If there is no precautionary action data associated with the represented geographic features, the process 400 loops back to get a new current vehicle position (Step 410). On the other hand, if there is precautionary action data associated with the represented geographic features, the process 400 takes a precautionary action (Step 450). The precautionary action may be a warning provided to the vehicle operator when the vehicle is at the location (i.e., 160(2) in FIG. 3) indicated by the precautionary action data. The warning may be provided via the user interface 354. The warning may be an audible warning message or a visual warning.

The precautionary action is not limited to warnings, but may also include other actions. For example, in the case of a curve with insufficient superelevation, vehicle systems 356, such as the brakes, engine or transmission, can be readied for a deceleration. In addition, the seatbelts may be tightened or the airbags set to deploy. As explained above, to facilitate these kinds of actions, additional information may be added to the warning data 160 (in FIG. 3) to indicate the type of action as well as the location where the action should be taken.

Referring still to FIG. 5, after taking the precautionary action, the process 400 loops back to get a new current vehicle position (Step 410).

Alternative with Dynamic Data

The process (400 in FIG. 5) was described as a way to use the precautionary action data that had been stored in the map database to take an appropriate action in a vehicle when the vehicle is at or is approaching a location identified as having a potentially hazardous condition. This process uses a positioning system and map database in the vehicle to determine when the vehicle is at or is approaching such a location. The process may also take into account dynamic information. Dynamic information may include current traffic and weather conditions, ambient light conditions, road conditions (e.g., ice), and so on. The vehicle may include systems to obtain such information. For example, the vehicle may have a traffic data receiver that obtains real-time traffic information, e.g., RDS-TMC messages. The process 400 may use the dynamic information in combination with the precautionary action data. For example, the process may modify the location at which a warning is provided. As an example, if weather conditions indicate that it is raining, the location at which a warning is provided to the vehicle driver about an upcoming curve with insufficient superelevation may be modified, i.e., adjusted to a point farther in advance of the location of the hazardous condition, in order to give the vehicle operator additional time or distance. The process may even take certain actions only under certain conditions. For example, a warning about insufficient superelevation may be provided only during nighttime hours or during inclement weather conditions.

Verification

The process (100 in FIG. 2) was described as a way to automatically examine records in a database that represents roads to identify locations or conditions along the road network where a precautionary action might be taken. According to the described process, data is then added to indicate the location where the precautionary action should be taken. Alternatively, instead of automatically adding the precautionary action data to the database, the locations where such conditions are identified could be marked on a temporary basis. Then, a geographic analyst (or other human operator) could review some or all such temporarily marked locations. The analyst may conduct this review by physically traveling to the locations or by reviewing satellite or aerial photographs of the locations, or video taken while driving by the locations (previously or subsequently acquired either by the analyst or others including members of the public). Based on the review, the analyst then determines whether precautionary action data should be added to the database.

It is intended that the foregoing detailed description be regarded as illustrative rather than limiting and that it is understood that the following claims including all equivalents are intended to define the scope of the invention.

I claim:

1. A vehicle comprising:
   one or more vehicle mechanical systems;
   a positioning system that determines a current location of the vehicle along a road of a road network relative to data representing a geographic region;
   a database that contains data representing the geographic region in which the vehicle is being operated, wherein the data includes data that represents roads of the road network located in the geographic region and precautionary action data associated with a plurality of locations along the roads of the road network where one or more different hazardous conditions which may impair control of the vehicle exists, wherein each of the plurality of locations where the hazardous condition exists comprises a location along a road of the road network at which it has been determined, prior to approach of the location by the vehicle, based on the data in the database that represents roads of a road network, that a condition comprising a combination of a curved section of road and insufficient superelevation thereof for operation of a vehicle at a given speed exists at the location;
   a precautionary action application, responsive to the positioning system and the database, that determines whether, based on the current location of the vehicle, the vehicle is approaching a location along a road of the road network associated with precautionary action data; and
   a vehicle control system coupled with the one or more vehicle mechanical systems and responsive to the precautionary action application to actuate at least a subset of the one or more vehicle mechanical systems to take a precautionary action when the precautionary action application determines that the vehicle is approaching a location along a road of the road network associated with precautionary action data.

2. The vehicle of claim 1 wherein the condition further comprises the insufficiency of the superelevation exceeding a threshold based on a speed limit, road surface type, presence of shoulders, or a combination thereof.

3. The vehicle of claim 1 wherein the one or more vehicle mechanical systems comprise brakes, engine, seatbelts, airbags, or stability control.

4. The vehicle of claim 1 wherein the positioning system is further operative determine a direction of travel of the vehicle and wherein the precautionary action data further includes data that indicates a direction along a road segment at which a precautionary action is to be taken, wherein the precautionary action application is further operative to determine whether the vehicle is approaching the location along a road of the road network associated with precautionary action data in the direction along the road segment at which the precautionary action is to be taken, the vehicle control system being further responsive thereto.

5. The vehicle of claim 1 wherein the precautionary action data further includes data that indicates a location along a road segment at which the precautionary action is to be taken by the vehicle preceding the location along the road of the road network associated with the precautionary action data, wherein the precautionary action application is further operative to determine whether the vehicle is at the location at which the precautionary action is to be taken, the vehicle control system being further responsive thereto.

6. The vehicle of claim 1 wherein the precautionary action data further includes data that refers to the location of the actual hazardous condition.

7. The vehicle of claim 1 wherein the vehicle control system is further responsive to the precautionary action application to not actuate at least a subset of the one or more vehicle mechanical systems to take a precautionary action when the precautionary action application determines that the vehicle is approaching a location along a road of the road network not associated with precautionary action data.

8. The vehicle of claim 1 further comprising one or more sensors operative to sense conditions ahead of the vehicle.

9. The vehicle of claim 8 wherein the one or more sensors comprise camera or radar.

10. The vehicle of claim 8 wherein the condition is not capable of being sensed by the sensors.

11. The vehicle of claim 8 wherein the precautionary action application determines whether the vehicle is approaching a location along a road of the road network associated with precautionary action data before any of the one or more sensors can sense the hazardous condition indicated thereby.

12. The vehicle of claim 1 wherein the precautionary action application determines whether the vehicle is approaching a location along a road of the road network associated with precautionary action data when the vehicle is operating in inclement weather.

13. The vehicle of claim 1 wherein the precautionary action includes maneuvering the vehicle, tightening seatbelts, pre-loading or engaging brakes, tightening sensitivities of lane departure warning systems or stability control systems, or readying the brakes, engine or transmission for quick deceleration or stop.

14. The vehicle of claim 1 wherein the precautionary action application is further operative to factor in dynamic information when determining whether the vehicle is approaching a location along a road of the road network associated with precautionary action data.

15. The vehicle of claim 14 wherein the dynamic information includes current traffic conditions, current weather conditions, current ambient light conditions, current road conditions, or combinations thereof.

16. The vehicle of claim 14 wherein the precautionary action application is further operative to alter a location at which a precautionary action is to be taken based on the dynamic information.

17. The vehicle of claim 1 wherein the data that represents roads of the road network located in the geographic region further includes data representing nodes (intersections), boundaries, cartographic features, pedestrian walkways, bike paths, or points-of-interest.

18. The vehicle of claim 1 wherein the database further includes precautionary action data in association with one or more locations defined as hazardous based on sufficient comments occurring about the particular location received via community input from citizens or organizations.

19. A method of operating a vehicle, the method comprising:
    determining, using a positioning system, a current location of the vehicle along a road of a road network relative to data representing a geographic region;
    accessing a database that contains data representing the geographic region in which the vehicle is being operated, wherein the data includes data that represents roads of the road network located in the geographic region and precautionary action data associated with a plurality of locations along the roads of the road network where one or more different hazardous conditions which may impair control of the vehicle exists, wherein each of the plurality of locations where the hazardous condition exists comprises a location along a road of the road network at which it has been determined, prior to approach of the location by the vehicle, based on the data in the database that represents roads of a road network, that a condition comprising a combination of a curved section of road and insufficient superelevation thereof for operation of a vehicle at a given speed exists at the location;
    determining, by a precautionary action application, responsive to the determination of the current position of the vehicle and the access to the database, whether, based on the current location of the vehicle, the vehicle is approaching a location along a road of the road network associated with precautionary action data; and
    actuating, by a vehicle control system coupled with one or more vehicle mechanical systems and responsive to the precautionary action application, at least a subset of the one or more vehicle mechanical systems to take a precautionary action when the precautionary action application determines that the vehicle is approaching a location along a road of the road network associated with precautionary action data.

20. The method of claim 19 wherein the condition further comprises the insufficiency of the superelevation exceeding a threshold based on a speed limit, road surface type, presence of shoulders, or a combination thereof.

21. The method of claim 19 wherein the one or more vehicle mechanical systems comprise brakes, engine, seatbelts, airbags, or stability control.

22. The method of claim 19 wherein the determining of the current location further comprises determining a direction of travel of the vehicle and wherein the precautionary action data further includes data that indicates a direction along a road segment at which a precautionary action is to be taken, wherein the determining of whether the vehicle is approaching the location along a road of the road network associated with precautionary action data further comprises determining whether the vehicle is approaching in the direction along the road segment at which the precautionary action is to be taken, the actuating being further responsive thereto.

23. The method of claim 19 wherein the precautionary action data further includes data that indicates a location along a road segment at which the precautionary action is to be taken by the vehicle preceding the location along the road of the road network associated with the precautionary action data, wherein the determining whether the vehicle is approaching a location along a road of the road network associated with precautionary action data further comprises determining whether the vehicle is at the location at which the precautionary action is to be taken, the actuating being further responsive thereto.

24. The method of claim 19 wherein the precautionary action data further includes data that refers to the location of the actual hazardous condition.

25. The method of claim 19 further comprising not actuating, by the vehicle control system, at least a subset of the one or more vehicle mechanical systems to take a precautionary action when the precautionary action application determines that the vehicle is approaching a location along a road of the road network not associated with precautionary action data.

26. The method of claim 19 further comprising one or more sensors operative to sense conditions ahead of the vehicle.

27. The method of claim 26 wherein the one or more sensors comprise camera or radar.

28. The method of claim 26 wherein the one or more different hazardous conditions comprises conditions not capable of being sensed by the sensors.

29. The method of claim 26 wherein the determining whether the vehicle is approaching a location along a road of the road network associated with precautionary action data further comprises determining whether the vehicle is approaching a location along a road of the road network associated with precautionary action data before any of the one or more sensors can sense the hazardous condition indicated thereby.

30. The method of claim 19 wherein the determining whether the vehicle is approaching a location along a road of the road network associated with precautionary action data further comprises determining whether the vehicle is approaching a location along a road of the road network associated with precautionary action data when the vehicle is operating in inclement weather.

31. The method of claim 19 wherein the actuating includes maneuvering the vehicle, tightening seatbelts, pre-loading or engaging brakes, tightening sensitivities of lane departure warning systems or stability control systems, or readying the brakes, engine or transmission for quick deceleration or stop.

32. The method of claim 19 wherein the determining whether the vehicle is approaching a location along a road of the road network associated with precautionary action data further comprises determining further comprises factoring in dynamic information when determining whether the vehicle is approaching a location along a road of the road network associated with precautionary action data.

33. The method of claim 32 wherein the dynamic information includes current traffic conditions, current weather conditions, current ambient light conditions, current road conditions, or combinations thereof.

34. The method of claim 32 further comprising altering a location at which a precautionary action is to be taken based on the dynamic information.

35. The method of claim 19 wherein the data that represents roads of the road network located in the geographic region further includes data representing nodes (intersections), boundaries, cartographic features, pedestrian walkways, bike paths, or points-of-interest.

36. The method of claim 19 wherein the database further includes precautionary action data in association with one or more locations defined as hazardous based on sufficient comments occurring about the particular location received via community input from citizens or organizations.

37. A method of operating a vehicle, the method comprising:
   determining, using a positioning system, a current location of the vehicle along a road of a road network relative to data representing a geographic region;
   accessing a database that contains data representing the geographic region in which the vehicle is being operated, wherein the data includes data that represents roads of the road network located in the geographic region and precautionary action data associated with a plurality of locations along the roads of the road network where one or more different hazardous conditions which may impair control of the vehicle exists, wherein each of the plurality of locations where the hazardous condition exists comprises a location along a road of the road network at which it has been determined, prior to approach of the location by the vehicle, based on the data in the database that represents roads of a road network, that a condition comprising a combination of a curved section of road and insufficient superelevation thereof for operation of a vehicle at a given speed exists at the location;
   determining, by a precautionary action application before an operator or sensors of the vehicle can sense the hazardous condition, responsive to the determination of the current position of the vehicle and the access to the database, whether, based on the current location of the vehicle, the vehicle is approaching a location along a road of the road network associated with precautionary action data;
   actuating, by a vehicle control system coupled with one or more vehicle mechanical systems and responsive to the precautionary action application, at least a subset of the one or more vehicle mechanical systems to take a precautionary action when the precautionary action application determines that the vehicle is approaching a location along a road of the road network associated with precautionary action data; and
   not actuating, by the vehicle control system, at least a subset of the one or more vehicle mechanical systems to take a precautionary action when the precautionary action application determines that the vehicle is approaching a location along a road of the road network not associated with precautionary action data.

* * * * *